United States Patent [19]

Klemme

[11] 4,335,222
[45] Jun. 15, 1982

[54] ADHESIVE SYSTEMS AND LAMINATES

[75] Inventor: Darrell A. Klemme, South Lyndeboro, N.H.

[73] Assignee: USM Corporation, Farmington, Conn.

[21] Appl. No.: 170,071

[22] Filed: Jul. 18, 1980

[51] Int. Cl.$^3$ .............................................. C08L 63/00
[52] U.S. Cl. .................................... 523/454; 428/416; 525/111; 523/456
[58] Field of Search ........................................ 525/111

[56] References Cited

U.S. PATENT DOCUMENTS

| | | | |
|---|---|---|---|
| 3,272,769 | 9/1966 | Hunyar | 525/111 |
| 3,539,480 | 11/1970 | Groff | 525/111 |
| 3,786,004 | 1/1974 | Furuya | 525/111 |
| 4,100,221 | 7/1978 | Passalenti | 525/111 |

FOREIGN PATENT DOCUMENTS 55-89363 5/1980 Japan ................................ 525/111

OTHER PUBLICATIONS

Teijin KK: J77030309.

Primary Examiner—Paul Lieberman
Attorney, Agent, or Firm—John P. Morley

[57] ABSTRACT

This invention presents to the art novel heat curable adhesive systems and laminates bonded by the adhesive system. The heat curable adhesive system comprises a heat curable adhesive composition which is a dispersion of a specific polyester, a polyvinylchloride which is or includes a carboxylated polyvinyl chloride and a polyepoxide and a curing agent for the adhesive composition. Curing of the adhesive composition can be effected at relatively low activation temperatures which provides distinct advantages in preparing laminates particularly those involving thin sheets of polymeric material bonded to metal sheet materials.

13 Claims, No Drawings

ADHESIVE SYSTEMS AND LAMINATES

BACKGROUND OF THE INVENTION (1) The Field of the Invention

This invention relates to novel adhesive compositions and to laminated articles using the novel adhesives presented. More precisely, this invention relates to novel adhesive compositions particularly useful for bonding sheets, film or bodies of polymeric materials to substrate surfaces and to laminates formed by such bonding.

(2) Description of the Prior Art

The bonding of a sheet or film or body of polymeric material to substrate surfaces particularly metal substrate surfaces is well known in the art. Essentially, adhesives used in this application must provide effective bonding between the polymeric material and the substrate surface under the conditions involved in forming the laminate and/or under the conditions of use assigned the laminate. Specialized problems however are presented in preparing laminates formed by bonding sheets of polymeric material and especially thin films of polymeric material to metal surfaces. These problems are particularly apparent in situations where such laminates are later subjected to operations involving shaping or working such as by forming or drawing. Such operations create exceptional stresses between the polymeric material and metal because of the stretching of the bonded materials and special adhesives and bond forming conditions are involved to provide a bond of requisite integrity and endurance during and after the operation.

Bonds of the requisite integrity and endurance have been achieved between polymeric material and metal surfaces using heat curable adhesive systems. Essentially, such bonding involves applying the heat curable adhesive system to at least one of the surfaces to be bonded, heating the applied adhesive to its activation temperature, bringing the other surface in contact with the heat activated adhesive and applying sufficient heat usually together with pressure until bonding (or cure) is complete.

Certain problems, however, have been encountered in the use of known heat curable adhesive systems which are attributed to the relatively high temperatures required to activate the systems. Commercially available heat curable adhesive systems used in laminating thin films of polymeric materials to metal surfaces for example normally require temperatures of above 200° C.—usually 225° C. or higher—for effective activation. High activation temperatures particularly complicate bond forming operations involving thin films of polymeric materials. Avoidance of or compensation for these complications usually requires the use of polymeric materials of specialized heat resistant formulations designed to provide reduced volatility and/or degradation under the bond forming conditions involved and, such formulations are expensive. Relatively expensive plasticizers and/or stabilizers for example are usually involved in such formulations. Moreover, bond forming operations involving thin films of polymeric material having patterned or embossed surfaces, e.g. leather grain or pebble finishes, require special considerations since the bond forming conditions can adversely affect the character of the surface of the polymeric material. High activation temperatures are particularly undesirable in bonding patterned or embossed polymeric materials to metal surfaces. The present invention is addressed to these and other problems presented by the high activation temperatures encountered in heat curable adhesive systems currently employed and presents novel heat curable adhesive systems and novel laminates bonded by the novel adhesive systems.

BRIEF SUMMARY OF THE INVENTION

The novel heat curable adhesive systems of the present invention comprises an adhesive composition provided by a novel combination of a polyester, a polyvinylchloride, a polyepoxide and a curing agent for the adhesive composition. Particularly desirable performance characteristics are provided by the novel heat curable adhesive systems especially in bonding thin film or sheets of polymeric materials to metal surfaces. The most outstanding performance characteristic involves the capability of the heat curable adhesive systems to be activated at relatively low temperatures and provide bonds of the requisite integrity and endurance between the surfaces. A low temperature activation capability greatly expands the latitude of polymeric materials available for use in providing laminates including polymeric materials materials. Relatively expensive polymeric sheet materials of specialized formulations for example are not required. Instead, less costly, commercially available grades of polymeric sheet materials can be effectively employed to provide the novel laminates of this invention. The low temperature activation capability of the novel heat curable adhesive system of this invention provides special advantages in providing laminates of metal bonded to thin films of polymeric materials including those having embossed or patterned surfaces. Adhesive systems having a low activation temperature capability permit faster, more efficient laminating under operating conditions minimizing the degradative effects of heat and pressure on the surface character of the polymeric material. Still other advantages and benefits of the practice of the invention will be apparent from the following detailed description of the novel heat curable adhesive system and the novel laminates bonded by the system.

DETAILED DESCRIPTION OF THE PREFERRED EMBODIMENTS

In accordance with the present invention, novel laminates bonded by novel heat curable adhesive systems are presented to the art. The laminates comprise a sheet of polymeric material bonded to a substrate surface and preferably to the surface of a metal substrate. Polymeric sheet materials normally used in such laminates are in the form of relatively thin films which may range from about 1 to about 10 mils in thickness and oftentimes have embossed or patterned surfaces to provide laminates for decorative as well as utilitary applications. Films useful in preparing laminates of the invention may comprise a variety of thermoplastic polymeric materials and may include dyes or pigments or additives such as plasticizers, lubricants and stabilizers or the like. Vinyl polymeric materials such as vinyl chloride and vinylidene chloride polymers and copolymers are used extensively in commercial laminate operations and these materials provide the preferred films for this invention. However, other commercially available films or sheets of polymeric materials such as polymers and copolymers of amides, esters, nitrites, butadiene, isoprene and styrene among others may be used.

A variety of substrates may be bonded to films of polymeric material to provide laminates of the present invention. Substrates of the same or other polymeric materials or of wood, glass and ceramics for example are suitable. However, the particularly preferred substrates are metal substrates comprising for example, steel, galvanized steel, titanium, copper, gold and silver among others as well as combinations of these and other metals. The thickness of the substrate is not especially critical but the application of sufficient heat to activate the heat curable system may be complicated if the substrate is relatively thick. However, in the especially preferred embodiment of the present invention in which metal substrates are involved, metal sheets of from about 0.010 inch to about 0.080 inch thickness are definitely preferred. Laminates including metal sheets of that range of thickness bonded to film of polymeric materials are usually employed in deep drawing or shaping operations which generate the localized stretching stresses mentioned before and therefore require bonds of exceptional integrity and endurance.

In accordance with the practice of this invention, novel laminates are prepared by applying a novel heat curable adhesive system to at least one of the surfaces to be bonded and applying sufficient heat and pressure after assembly to cure the adhesive system. Essentially, the novel heat curable adhesive systems of this invention include an adhesive composition comprising a combination of a polyester, a polyvinylchloride, a polyepoxide and a curing agent for the adhesive composition.

The polyester included in the heat curable adhesive composition of the present invention is the reaction product of a combination of diols, a combination of phthalic acids and a combination of phthalic acid anhydrides. The combination of diols or glycols include 1,4 butane diol and neopentyl glycol. Preferred diol combinations are those in which the neopentyl glycol represents from about 55 to about 85 percent by weight of the diol combination and particularly those in which the neopentyl glycol represents from about 65 to about 80 percent by weight of the combination. Minor amounts of other diols or combinations of other diols may be included in the 1,4 butane diol/neopentyl glycol combination. These other glycols include ethylene glycols, propane diols, xylylene glycols, 1,6 hexandiol, cyclohexane diols, polyethylene glycols and polytetramethylene glycols among others.

The combination of phthalic acids used in preparing the polyester of the novel heat curable adhesive composition of this invention includes isophthalic acid and terephthalic acid. Preferred combinations of phthalic acids are those in which the isophthalic acid represents from about 40 to about 80 percent by weight of the combination and particularly those in which the isophthalic acid represents from about 50 to about 70 percent by weight of the combination of acids. Other dicarboxylic acids may be included in the combination in minor amounts. These other acids may be aliphatic dicarboxylic acids such as azelaic, sebacic, adipic and dodecane dicarboxylic acid and/or alicyclic dicarboxylic acids such as cyclohexane dicarboxylic acid and/or aromatic dicarboxylic acids such as naphthalenedicarboxylic acid.

The combination of phthalic acid anhydrides used in the preparation of the polyester component of the novel heat curable adhesive composition includes a difunctional and a trifunctional phthalic anhydride. The preferred difunctional phthalic anhydride is hexahydrophthatic anhydride while the preferred trifunctional phthalic anhydride is trimellitic anhydride. The trifunctional phthalic anhydride provides accelerated cure rates and increased degree of cure and the amount used can vary to accommodate these considerations. Preferred combinations are those in which the hexahydrophthalate anhydride represents from about 55 to about 95 percent by weight of the combination and particularly those in which the hexahydrophthalate anhydride represents from about 70 to about 90 percent by weight of the phthalic acid anhydride combination.

In preparing polyesters used in the heat curable adhesive compositions of this invention, the reactant combinations e.g. the diol, phthalic acid and phthalic acid anyldride combinations are polymerized in the presence of a suitable esterification polymerization catalyst. Suitable catalysts include dibutyl tin oxide, mono-butyl tin oxide, stannous oxalate and lithium acetate among others. The amount of polymerization catalyst can vary and suitable amounts include from about 0.01 to about 0.5 percent by weight of the catalyst and reactant combinations. In preparing the polyesters of the invention, the ratio of the reactant combinations can also vary and suitable ratios are described in tabular form below:

TABLE I

| REACTANT COMBINATION | PERCENT BY WEIGHT OF COMBINED REACTANT COMBINATIONS | |
|---|---|---|
| | RANGE | PREFERRED |
| DIOL COMBINATIONS | | |
| 1,4 Butane Diol | 30-50 | 35-45 |
| Neopentyl Glycol | | |
| PHTHALIC ACID COMBINATIONS | | |
| Isophthalic acid | 40-60 | 45-55 |
| Terephthalic acid | | |
| PHTHALIC ACID ANHYDRIDE COMBINATION | | |
| Hexahydrophthalic anhydride | 5-15 | 8-12 |
| Trimellitic anhydride | | |

Polyesters used in preparing heat curable adhesive compositions of the invention have softening points between about 90° C. to about 120° C., melting points between about 100° C. to about 150° C. and a Brookfield Viscosity at 25° C. between about 100 to about 175 cps for a 25 percent by weight solution of the polyester in toluol. A detailed description of the preparation of the preferred polyester of Table I is contained in Example 1 which follows later.

In addition to a polyester of the type described above, the heat curable adhesive compositions of this invention include a polyvinylchloride and a polyepoxide. The polyvinylchloride of the adhesive composition of this invention is or includes a carboxylated polyvinylchloride. Preferred carboxylated polyvinylchlorides are copolymers of vinyl chloride and vinyl acetate in which the percent by weight of vinyl chloride is between about 80 to about 95 percent by weight of the polymer and the percent by weight of carboxy groups is between about 0.25 to about 2.5 percent. An especially preferred carboxylated vinyl chloride is a copolymer of vinyl chloride with vinyl acetate where the percent by weight vinyl chloride is from about 80 to about 88 percent and the percent by weight of carboxy groups is between about 0.5 to about 1 percent. Mixtures of carboxylated polyvinylchloride with other polyvinylchlorides can be suitably employed in adhesive compositions of this invention. Accordingly it should be understood that the term "polyvinylchloride" as used throughout the specification and in the claims embraces mixtures of carboxylated polyvinylchlorides and other polyvinylchlorides in which the percent by weight of carboxylated polyvinylchloride in the mixture is from about 25 to 100 percent. Preferred mixtures however are those in which the percent by weight of carboxylated polyvinylchloride is from about 50 to 100 percent by weight. Hydroxyl modified polyvinylchlorides are particularly preferred for admixture with the carboxylated polyvinylchlorides. Especially suitable are copolymers of vinylchloride and vinyl acetate having between about 85 to about 95 percent by weight vinyl chloride and a percent by weight of hydroxy groups between about 2 to about 6 percent.

The polyepoxides included in the heat curable adhesive compositions of this invention are the commercially available diglycidyl ethers. They are commonly referred to in the art as polyepoxides prepared by the reaction of epichlorohydrin with bisphenol A and conform to the following structure:

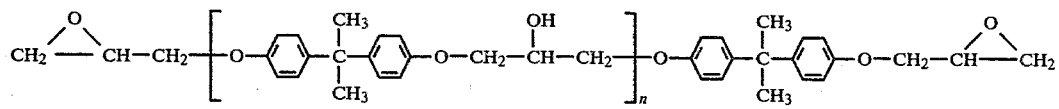

where n is less than 1 for liquid polyepoxides and 2 or greater for solid polyepoxides. Preferred polyepoxides are those liquid polyepoxides which are soluble in conventional solvents such as toluol, methyl ethyl ketone and tetrahydrofuran and have viscosities between about 10,000 to about 20,000 cps at 25° C. and epoxide equivalents between about 175 to about 200.

The above described polyester, polyvinylchloride and polyepoxide are dispersed in a suitable solvent to provide adhesive compositions for the heat curable adhesive systems of this invention. Suitable solvents include methyl ethyl ketone, toluol, acetone and tetrahydrofuran among others as well as combinations of such solvents. The percent by weight of solvent to polyester, polyvinylchloride and polyepoxide in the adhesive compositions can vary depending primarily on viscosity considerations. Suitable adhesive compositions are those in which the percent by weight solvent is between about 50 to about 90 percent by weight of the composition.

The ratio of polyester to polyvinylchloride to polyepoxide is a feature of some importance in preparing adhesive compositions of the heat curable systems of the invention. Maximized adhesive performance characteristics in polymeric material/metal laminating applications have been achieved with those adhesive compositions in which the amounts of polyvinylchloride and polyepoxide used are substantially equivalent and the ratio of polyester to polyvinylchloride to polyepoxide is between about 3.5:1:1 to about 4.5:1:1. The particularly preferred ratio is about 4:1:1. As mentioned above, the term "polyvinylchloride" as used in the ratios described includes mixtures having from about 25 to 100 percent by weight carboxylated polyvinylchlorides. Adhesive compositions described above can contain additional ingredients such as fillers, adhesion promotors and antioxidants among others. Representative adhesive compositions for the heat curable adhesive systems of the invention are described in Table 2 below:

TABLE 2

| INGREDIENT | PERCENT BY WEIGHT | |
|---|---|---|
| | RANGE | PREFERRED |
| Polyester | 10-30 | 14-18 |
| Polyvinylchloride | 1-6 | 2-5 |
| Polyepoxide | 2-6 | 3-5 |
| Solvent | 55-90 | 70-80 |

The heat curable adhesive systems of this invention include a curing agent for the adhesive composition described above. Essentially the curing agent should be capable of being effectively dispersed in the adhesive composition and capable of activating or initiating curing of the composition at ambient temperatures and accelerated curing at elevated temperatures. Preferred curing agents for the adhesive compositions include trifunctional polyisocyanates; for example polymethylene polyphenylisocyanate. The curing agent can be dispersed directly in the adhesive composition without dilution. Normally, however, the curing agent is dispersed in a suitable solvent and the curing agent dispersion combined with the above described adhesive compositions at the time of bond formation. For example a solution of about 70 percent by weight polymethylene polyphenylisocyanate dispersed in about 30 percent by weight methyl ethyl ketone is particularly suitable for curing the adhesive compositions described above. The amount of curing agent containing dispersion combined with the adhesive composition can vary depending primarily on the degree of cure or cure rate desired. In general practice, from about 10 to about 40 parts by volume of the adhesive composition are combined with 1 part by volume of the curing agent containing dispersions.

The following Examples are presented to illustrate the practice of the invention.

EXAMPLE 1

This Example illustrates the preparation of a preferred polyester for use in preparing preferred adhesive compositions of the invention.

1. Charge the batch materials listed in Table 3 below to an enclosed reactor equipped with a stirrer, a condensor column for refluxing and means to maintain a nitrogen flow through the reactor.

TABLE 3

| MATERIAL | POUNDS |
|---|---|
| 1,4 Butanediol | 9.23 |
| Neopentyl glycol | 28.33 |
| Terephthalic acid | 19.57 |
| Isophthalic acid | 31.07 |
| Hexahydrophthalic anhydride | 8.95 |
| Trimellitic anhydride | 1.08 |
| Di-butyl tin oxide | 0.17 |

2. Charge the batch materials while maintaining slow agitation and establish and maintain a nitrogen flow through the reactor after addition is complete.

3. Heat the batch materials to a temperature of 220° C. and note the temperature at which distillation starts.

4. When distillation starts, feed cold water to the distillation column and set the condensor system for complete reflux.

5. Continue refluxing under complete refluxing conditions until a drop in batch temperature is noted.

6. When a drop in batch temperature is noted, feed warm water to the condensor column to maintain the top column temperature at a temperature below 210° C.

7. Maintain the batch temperature at 220° C. under these refluxing conditions until the batch clears and the top column temperature begins to drop.

8. Add 1.63 pounds of 1,4 butanediol to the batch materials and let materials mix for one hour.

9. Transfer the batch materials to a temperature controlled, vacuum polymerization reactor.

10. Apply a vacuum of about 21" to the reactor and hold for thirty minutes while batch temperature is maintained at 245°–250° C.

11. Apply a vacuum of about 27" to the reactor and hold for 45 minutes.

12. Increase the vacuum to apply the best possible vacuum for the reactor and continue to maintain the best possible vacuum until sampling indicates that a 25 percent by weight solution of sample reaction product in toluol has a Brookfield Viscosity at 25° C. between about 100 to about 175 cps.

13. Discharge the polyester and grind (after freezing).

A polyester produced according to the above procedure had a softening point of 103° C.–110° C., a melting point of 111° C.–134° C. A 25 percent by weight solution of the polyester in toluol had a Brookfield Viscosity at 25° C. of between about 100 to about 175 cps and a Gardner Color of from 3–5.

EXAMPLE 2

A solution of an adhesive composition of the heat curable adhesive system of the invention was prepared by mixing together the ingredients listed below:

| INGREDIENT | PERCENT BY WEIGHT |
|---|---|
| Polyester of Example 1 | 16 |
| Carboxylated polyvinyl chloride[1.] | 4 |
| Polyepoxide[2.] | 4 |
| Adhesion promotor[3.] | 1 |
| Methyl ethyl ketone | 60 |
| Toluol | 15 |

1. The carboxylated polyvinyl chloride used in this Example was a copolymer of vinyl chloride and vinyl acetate sold by Union Carbide under the product designation "VMCH". According to Union Carbide published information, "VMCH" has a chemical composition of 86 percent by weight vinyl chloride and 13 percent by weight vinyl acetate and about 1 percent by weight of carboxy groups.

2. The polyepoxide used in this and all other Examples is a liquid polyepoxide sold by Ciba-Geigy Corporation under the tradename Araldite 6010.

3. The adhesion promotor used in this Example was a benzoguanamine resin sold by Reichhold Chemicals Incorporated under the product designation "27810 Uformite QR336".

EXAMPLE 3

Another solution of an adhesive composition of a heat curable system of the invention was prepared by mixing together the ingredients listed below:

| INGREDIENT | PERCENT BY WEIGHT |
|---|---|
| Polyester (Example 1) | 17 |
| Carboxylated polyvinylchloride[4.] | 2 |
| Hydroxy modified polyvinylchloride[5.] | 2 |
| Polyepoxide | 4 |
| Methyl ethyl ketone | 60 |
| Toluol | 15 |

4. The carboxylated polyvinylchloride in this Example was the "VMCH" carboxylated polyvinylchloride of Example 2.

5. The hydroxy modified polyvinylchloride used in this Example is sold by Union Carbide under the product designation "VAGH". According to Union Carbide published information, "VAGH" has a chemical composition of 91 percent by weight vinyl chloride and 3 percent by weight vinyl acetate and a hydroxyl content of about 6 percent by weight.

EXAMPLE 4

Another solution of an adhesive composition of a heat curable adhesive system of the invention was prepared by mixing together the ingredients listed below:

| INGREDIENT | PERCENT BY WEIGHT |
|---|---|
| Polyester (Example 1) | 17 |
| Carboxylated polyvinylchloride[6.] | 17 |
| Polyepoxide | 4 |
| Methyl ethyl ketone | 36 |
| Tetrahydrofuran | 24 |
| Toluene | 15 |

6. The carboxylated polyvinylchloride used was the "VMCH" of Example 2.

EXAMPLE 5

This example involves a comparison of the adhesive performance characteristics of the heat curable adhesive compositions of Examples 2–4 with a commercially available heat curable adhesive composition (Control). The Control commercially available heat curable composition used in this Example is Bostik 7132 sold by Bostik and contains the ingredients listed below:

| INGREDIENT | PERCENT BY WEIGHT |
|---|---|
| Polyester[7.] | 18 |
| Carboxylated polyvinyl chloride[8.] | 4 |
| Polyepoxide | 4 |
| Methyl ethyl ketone | 24 |
| Toluol | 26 |
| Tetrahydrofuran | 24 |

7. The polyester included in this adhesive composition contains the following ingredients.

| INGREDIENT | PERCENT BY WEIGHT |
|---|---|
| 1,4 Butane diol | 40 |
| Terephthalic Acid | 15 |
| Isophthalic Acid | 35 |
| Trimellitic Anhydride | 1.1 |

| INGREDIENT | PERCENT BY WEIGHT |
| --- | --- |
| -continued | |
| Hexahydrophthalic Anhydride | 8.8 |

The polyester has a Brookfield Viscosity at 25° C. of 110–116 cps for a 25 percent by weight solution of the polyester in tetrahydrofuran and a Ball and Ring Melting point from about 110° C. to about 128° C.

8. The carboxylated polyvinylchloride used in this Example is the VMCH of Example 2.

Heat curable adhesive systems were prepared by mixing a curing agent with the adhesive compositions of Examples 2–4 and the Control. The curing agent was a methyl ethyl ketone solution of a polymethylene polyphenyl isocyanate supplied by the Upjohn Company under the Trademark "papi". The percent by weight polymethylene polyphenyl isocyanate in the solution was 69 percent and one part by volume of the curing agent containing solution was mixed with 20 parts by volume of each adhesive composition. The heat curable adhesive systems e.g. the curing agent and curable adhesive composition, were each applied to a surface of cold rolled steel sheets 4 inch × 6 inch × 0.029 inch thick to provide-on drying-a thickness of adhesive system on the surface of about 0.0002 inch.

Each steel sheet carrying the applied adhesive system was then placed on a conveyor which carried it through a heating tunnel where the underside was subjected to infrared heat to raise the temperature of the metal workpiece from about 23° C. to about 150° C. and this temperature was attained in about 40 seconds. This heating drives off solvent from the applied layer and activates or initiates cure of the adhesive system. On leaving this heating tunnel, the adhesive was at a temperature of 150° C. and was semisolid but tacky and capable of wetting adhesive engagement and strong bonding to surfaces brought against it.

Directly after leaving the tunnel, a three-dimensional patterned textured surface; plasticized polyvinyl chloride sheet having a thickness of 6 mils was laid down on the adhesive surface and passed between nip rolls. The rolls were rotated at a rate giving a linear speed of about 15 feet per minute and were pressed together with a force to provide a pressure on the assembled metal sheet and polyvinyl chloride sheet of about twenty p.s.i. The assembled laminate was then passed immediately into a water quenching bath maintained at room temperature.

In order to determine and compare the bonding performance characteristics of the heat curable adhesive systems of the laminates of this Example, each laminate was subjected to tests 4.3.1.1 and 4.3.1.3 described in "Commercial Standard CS 245-62 Vinyl of Metal Laminate" published by The U.S. Department of Commerce. Test 4.3.1.1 is known as the "Ball Test" and involves making cross knife cuts in the polymeric sheet material bonded to a metal substrate in an area of the laminate into which a 1 inch diameter ball is forced to make a ⅜ inch dome. Attempts are made to pull bonded polymeric sheet material from the metal in quadrants formed by the knife cuts. Test 4.3.1.3 is known as the "Boiling Water Test" in which a "Ball Test" specimen is placed in boiling water for one hour, cooled at room temperature for one hour and then examined for delamination at the knife marks. The results of the tests are presented in tabular form below:

| ADHESIVE SYSTEM | TEST | |
| --- | --- | --- |
| | 4.3.1.1 | 4.3.1.3 |
| CONTROL | Failed (0.38 in$^2$) | Failed |
| Example 2 | Passed (0.25 in$^2$) | Passed |
| Example 3 | Passed (0.25 in$^2$) | Passed |
| Example 4 | Passed (0.19 in$^2$) | Passed |

From the above Example, it should be apparent that the novel heat curable adhesive systems of this invention provide distinctively desirable performance characteristics. The system presents an effective capability for providing bonds of the stringent integrity and durability needed for polymeric sheet material/metal laminations. Moreover, the bonding is achieved at activation temperatures significantly lower than heat curable adhesive systems known to the art. The low heat activation temperature greatly expands the latitude of polymeric formulations suitable for use in polymeric sheet material/metal laminations. The criticality of the degradative effects of operational temperatures are effectively diminished and the need for costly specialized plasticizers or stabilizers is minimized. Additionally, the low activation temperatures provide special advantages in fabricating laminations involving textured or patterned surface polymeric sheet materials permitting assembly under conditions significantly more conducive for producing finished products of improved overall uniformity and quality. Accordingly, the novel heat curable adhesive systems and laminates using them are unexpectedly different from those known to the art at the time the invention was made.

I claim:

1. A heat curable adhesive system comprising an adhesive composition and a curing agent for the composition, said adhesive composition comprising a dispersion of from about 10 to about 30 percent by weight of a polyester, from about 1 to about 6 percent by weight of a polyvinylchloride which comprises from about 25 to 100 percent by weight of a carboxylated polyvinylchloride and from about 1 to about 6 percent by weight of a polyepoxide, said polyester being the product of a reaction between a combination of diols, a combination of phthalic acids and, a combination of phthalic acid anhydrides where:

a. the combination of diols represents from about 30 to about 50 percent by weight of the reactants and consists essentially of 1,4 butane diol and neopentyl glycol and the neopentyl glycol represents from about 55 to about 85 percent by weight of the combination of diols, b. the combination of phthalic acids represents from about 40 to about 60 percent by weight of the reactants and consists essentially of isophthalic acid and terephthalic acid and the isophthalic acid represents from about 40 to about 80 percent by weight of the phthalic acid combination and, c. the combination of phthalic acid anhydrides represents from about 5 to about 15 percent by weight of the reactants and consists essentially of hexahydrophthalic anhydride and trimellitic anhydride and the hexahydrophthalic anhydride represents from about 55 to about 95 percent by weight of the phthalic acid anhydride combination and, a curing agent dispersible in said adhesive composition and capable of initiating cure of said adhesive composition.

2. A heat curable adhesive system of claim 1 where the percent by weight of said polyester is between about 14 to about 18 percent, the percent by weight of said polyvinylchloride is between about 2 to about 5 percent and the percent by weight of said polyepoxide is between about 3 to about 5 percent.

3. A heat curable system of claims 1 or 2 where the amounts of polyvinylchloride and polyepoxide are substantially equivalent and the ratio of polyester to polyvinylchloride to polyepoxide is between about 3.5:1:1 to about 4.5:1:1.

4. A heat curable adhesive system of claims 1 or 2 where the amounts of polyvinylchloride and polyepoxide are substantially equivalent and the ratio of polyester to polyvinylchloride to polyepoxide is about 4:1:1.

5. A heat curable adhesive system of claims 1 or 2 where the percent by weight of neopentyl glycol is between about 65 to about 80 percent, the percent by weight of isophthalic acid is between about 50 to about 70 percent and the percent by weight of said hexahydrophthalic acid anhydride is between about 70 to about 90 percent.

6. A heat curable adhesive system of claims 1 or 2 where the curing agent comprises a trifunctional polyisocyanate.

7. A heat curable adhesive system of claims 1 or 2 where the curing agent comprises a polymethylene polyphenylisocyanate.

8. A heat curable adhesive system of claims 1 or 2 where the adhesive composition includes a solvent chosen from the group consisting of methyl ethyl ketone, toluol, acetone and tetrahydrofuran or mixtures of these.

9. A heat curable adhesive system of claims 1 or 2 where the polyvinylchloride includes from about 50 to 100 percent by weight of a carboxylated polyvinylchloride.

10. A heat curable adhesive system of claim 9 where the amounts of polyvinylchloride and polyepoxide are substantially equivalent and the rate of polyester to polyvinylchloride to polyepoxide is between about 3.5:1:1 to about 4.4:1:1.

11. A heat curable adhesive system of claim 10 where the polyvinylchloride includes 100 percent by weight of carboxylated polyvinylchloride having a percent by weight of carboxy groups between about 0.5 to about 1 percent.

12. A heat curable adhesive system of claim 9 where the amounts of polyvinylchloride and polyepoxide are substantially equivalent and the ratio of polyester to polyvinylchloride to polyepoxide is about 4:1:1.

13. A heat curable adhesive system of claim 12 where the polyvinylchloride includes 100 percent by weight of a carboxylated polyvinylchloride having a percent by weight of carboxy groups between about 0.5 to about 1 percent.

* * * * *